United States Patent
Tanaka et al.

(10) Patent No.: US 10,850,340 B2
(45) Date of Patent: Dec. 1, 2020

(54) WELDING DEVICE

(71) Applicant: Panasonic Intellectual Property Management Co., Ltd., Osaka (JP)

(72) Inventors: Yoshiaki Tanaka, Osaka (JP);
Kazunori Matsumoto, Osaka (JP);
Kimiya Sato, Hyogo (JP); Akira Nakagawa, Osaka (JP); Hiroki Yuzawa, Saitama (JP); Hideki Ihara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 346 days.

(21) Appl. No.: 16/106,363

(22) Filed: Aug. 21, 2018

(65) Prior Publication Data

US 2018/0354048 A1 Dec. 13, 2018

Related U.S. Application Data

(62) Division of application No. 13/318,648, filed as application No. PCT/JP2010/006583 on Nov. 10, 2010, now Pat. No. 10,058,947.

(30) Foreign Application Priority Data

Nov. 25, 2009 (JP) ................. 2009-267123

(51) Int. Cl.
*B23K 9/073* (2006.01)
*B23K 9/12* (2006.01)
*B23K 9/09* (2006.01)

(52) U.S. Cl.
CPC ............... *B23K 9/073* (2013.01); *B23K 9/09* (2013.01); *B23K 9/124* (2013.01)

(58) Field of Classification Search
CPC ........... B23K 9/09; B23K 9/073; B23K 9/124
(Continued)

(56) References Cited

U.S. PATENT DOCUMENTS

| 2,669,640 A | * | 2/1954 | Outcalt | ................. | B23K 9/125 |
| | | | | | 219/73.21 |
| 3,339,057 A | * | 8/1967 | Bernard | ................... | B23K 9/09 |
| | | | | | 219/137.7 |

(Continued)

FOREIGN PATENT DOCUMENTS

| CN | 1665633 A | 9/2005 |
| CN | 100337826 C | 9/2007 |

(Continued)

OTHER PUBLICATIONS

Chinese Search Report for Chinese Application No. 201080023944. 0, dated Nov. 14, 2013—2 pages 2018.

(Continued)

*Primary Examiner* — Jimmy Chou
(74) *Attorney, Agent, or Firm* — RatnerPrestia

(57) ABSTRACT

In a method and device for performing welding, after the welding current reaches a first current value during a short circuit, the feeding of the welding wire is stopped, slowed down, or moved backward. As a result, the opening of a short circuit is urged to reduce the frequency at which welding is unnecessarily interrupted by an overcurrent protection function. This achieves high weld quality such as the absence of welding defects, and high production efficiency.

4 Claims, 8 Drawing Sheets

US 10,850,340 B2

Page 2

(58) Field of Classification Search
USPC ....... 219/130.51, 130.21, 54, 30 R, 69.1, 73, 219/61.4, 137, 137.71, 130.32, 130.4
See application file for complete search history.

(56) References Cited

U.S. PATENT DOCUMENTS

| | | | | | |
|---|---|---|---|---|---|
| 3,581,053 | A * | 5/1971 | Manz | | B23K 9/091 219/137 R |
| 3,956,610 | A * | 5/1976 | Kanbe | | B23K 9/0216 219/137 PS |
| 4,000,374 | A * | 12/1976 | De Keyser | | B23K 9/125 219/130.33 |
| 4,072,997 | A * | 2/1978 | Boothman | | H02H 6/00 219/494 |
| 4,246,463 | A * | 1/1981 | Shutt | | B23K 9/188 219/122 |
| 4,300,036 | A * | 11/1981 | Johansson | | B23K 9/091 219/130.33 |
| 4,529,864 | A * | 7/1985 | Bennett | | B23K 9/125 219/137 PS |
| 4,546,234 | A * | 10/1985 | Ogasawara | | B23K 9/125 219/130.21 |
| 4,780,594 | A * | 10/1988 | Rothermel | | B23K 9/124 219/137.71 |
| 4,954,691 | A * | 9/1990 | Parks | | B41M 1/00 219/130.21 |
| 4,972,064 | A * | 11/1990 | Stava | | B23K 9/091 219/130.21 |
| 4,994,651 | A * | 2/1991 | Jones | | H02H 3/023 219/494 |
| 5,001,326 | A * | 3/1991 | Stava | | B23K 9/00 219/130.21 |
| 5,003,154 | A * | 3/1991 | Parks | | B23K 9/092 219/130.21 |
| 5,864,116 | A * | 1/1999 | Baker | | B23K 9/092 219/130.33 |
| 6,037,554 | A * | 3/2000 | Innami | | B23K 9/092 219/130.21 |
| 6,111,216 | A * | 8/2000 | Stava | | B23K 9/091 219/130.51 |
| 6,160,241 | A * | 12/2000 | Stava | | B23K 9/0216 219/130.21 |
| 6,429,404 | B1 * | 8/2002 | Suzuki | | B23K 9/0216 219/124.34 |
| 6,441,342 | B1 * | 8/2002 | Hsu | | B23K 9/091 219/130.01 |
| 6,489,592 | B2 * | 12/2002 | Stava | | B23K 9/092 219/130.51 |
| 6,627,850 | B1 * | 9/2003 | Koga | | B23K 9/124 219/137.71 |
| 7,102,099 | B2 * | 9/2006 | Huismann | | B23K 9/073 219/130.51 |
| 7,495,193 | B2 * | 2/2009 | Myers | | B23K 9/092 219/130.51 |
| 7,525,066 | B2 * | 4/2009 | Mukai | | B23K 9/0671 219/124.01 |
| 7,575,294 | B2 | 8/2009 | Imanaka et al. | | |
| 7,705,270 | B2 * | 4/2010 | Norrish | | B23K 9/095 219/137.71 |
| 8,080,763 | B2 * | 12/2011 | Fujiwara | | B23K 9/125 219/130.51 |
| 8,502,114 | B2 * | 8/2013 | Hirota | | B23K 9/093 219/130.32 |
| 8,513,568 | B2 * | 8/2013 | Kawamoto | | B23K 9/0735 219/130.21 |
| 8,809,735 | B2 * | 8/2014 | Kawamoto | | B23K 9/125 219/130.21 |
| 8,901,454 | B2 * | 12/2014 | Nakagawa | | B23K 9/0671 219/137 R |
| 2002/0128743 | A1 | 9/2002 | Kurihara | | B23H 7/065 700/162 |
| 2003/0006222 | A1 * | 1/2003 | Houston | | B23K 9/0956 219/130.51 |
| 2004/0050833 | A1 * | 3/2004 | Stava | | B23K 9/1735 219/130.51 |
| 2004/0232129 | A1 * | 11/2004 | Houston | | B23K 9/1043 219/130.51 |
| 2004/0245230 | A1 * | 12/2004 | Huismann | | B23K 9/124 219/137.7 |
| 2005/0061791 | A1 | 3/2005 | Matus et al. | | |
| 2005/0161448 | A1 * | 7/2005 | Stava | | B23K 9/133 219/130.21 |
| 2005/0269306 | A1 * | 12/2005 | Fulmer | | B23K 9/0738 219/130.51 |
| 2006/0124622 | A1 * | 6/2006 | Hubinger | | B23K 9/124 219/137.31 |
| 2006/0138115 | A1 * | 6/2006 | Norrish | | B23K 9/09 219/137.71 |
| 2007/0056944 | A1 * | 3/2007 | Artelsmair | | B23K 9/092 219/130.5 |
| 2007/0102411 | A1 * | 5/2007 | Takano | | B23K 9/0735 219/137.71 |
| 2007/0221642 | A1 * | 9/2007 | Era | | B23K 9/0956 219/130.21 |
| 2007/0221643 | A1 * | 9/2007 | Narayanan | | B23K 9/092 219/137 R |
| 2008/0156781 | A1 * | 7/2008 | Artelsmair | | B23K 9/092 219/130.5 |
| 2008/0169276 | A1 * | 7/2008 | Mukai | | B23K 9/0671 219/124.01 |
| 2008/0290079 | A9 * | 11/2008 | Artelsmair | | B23K 9/0735 219/137.71 |
| 2008/0296265 | A1 * | 12/2008 | Hiroi | | B23K 9/1012 219/72 |
| 2008/0308540 | A1 * | 12/2008 | Hiroi | | B23K 9/0953 219/130.21 |
| 2008/0308541 | A1 * | 12/2008 | Hiroi | | B23K 9/1043 219/134 |
| 2008/0314884 | A1 * | 12/2008 | Fujiwara | | B23K 9/092 219/130.51 |
| 2009/0026188 | A1 * | 1/2009 | Schorghuber | | B23K 9/124 219/137 PS |
| 2009/0114631 | A1 * | 5/2009 | Chevalier | | B23K 9/124 219/137.7 |
| 2009/0152252 | A1 * | 6/2009 | Kawamoto | | B23K 9/092 219/130.51 |
| 2009/0166344 | A1 * | 7/2009 | Hamalainen | | B23K 9/092 219/130.51 |
| 2009/0173726 | A1 * | 7/2009 | Davidson | | B23K 9/0956 219/130.01 |
| 2009/0242534 | A1 * | 10/2009 | Artelsmair | | B23K 9/0737 219/137 PS |
| 2009/0277893 | A1 * | 11/2009 | Speilman | | B23K 9/095 219/137.71 |
| 2010/0176104 | A1 * | 7/2010 | Peters | | B23K 9/0738 219/130.21 |
| 2010/0176105 | A1 * | 7/2010 | Hongu | | B23K 9/0953 219/130.51 |
| 2010/0224606 | A1 * | 9/2010 | Hutchison | | B23K 9/1062 219/130.21 |
| 2010/0270278 | A1 * | 10/2010 | Daniel | | B23K 9/126 219/130.21 |
| 2011/0058826 | A1 * | 3/2011 | Jeong | | G03G 15/2007 399/33 |
| 2011/0204033 | A1 * | 8/2011 | Schartner | | B23K 9/0953 219/130.21 |
| 2012/0074114 | A1 * | 3/2012 | Kawamoto | | B23K 9/09 219/130.21 |
| 2012/0080409 | A1 * | 4/2012 | McQuerry | | B23K 9/1006 219/68 |
| 2012/0111842 | A1 * | 5/2012 | Fujiwara | | B23K 9/09 219/130.33 |
| 2012/0145691 | A1 * | 6/2012 | Fujiwara | | B23K 9/0956 219/130.31 |
| 2012/0199567 | A1 * | 8/2012 | Nakagawa | | B23K 9/173 219/137 R |
| 2012/0223063 | A1 * | 9/2012 | Tanaka | | B23K 9/073 219/130.01 |

(56) References Cited

U.S. PATENT DOCUMENTS

| | | | | |
|---|---|---|---|---|
| 2012/0255940 A1* | 10/2012 | Fujiwara | ............. | B23K 9/1012 219/137 R |
| 2013/0180971 A1* | 7/2013 | Peters | .................... | B23K 9/125 219/137.7 |
| 2013/0299476 A1* | 11/2013 | Fujiwara | ................ | B23K 9/092 219/130.51 |
| 2015/0076132 A1* | 3/2015 | Murakami | ............. | B23K 9/173 219/137.71 |

FOREIGN PATENT DOCUMENTS

| | | | |
|---|---|---|---|
| CN | 101151118 A | | 3/2008 |
| JP | 4998351 A | | 9/1974 |
| JP | 60106668 A | | 6/1985 |
| JP | 60187468 A | | 9/1985 |
| JP | 6178567 A | | 4/1986 |
| JP | 61229471 A | | 10/1986 |
| JP | 63016868 A | | 1/1988 |
| JP | 2515273 A | | 7/1996 |
| JP | 11090628 | | 4/1999 |
| JP | 2004298924 A | * | 10/2004 |
| JP | 2004298924 A | | 10/2004 |
| JP | 2008068283 A | | 3/2008 |
| JP | 2008068283 A | * | 3/2008 |
| WO | 0054924 A1 | | 9/2000 |
| WO | WO-0054924 A1 | * | 9/2000 ............. B23K 9/124 |
| WO | 03101658 A1 | | 12/2003 |
| WO | WO-03101658 A1 | * | 12/2003 ............. B23K 9/095 |

OTHER PUBLICATIONS

Extended European Search Report for European Application No. 10832808.9, dated Mar. 19, 2015—5 pages 2018.

International Search Report and Written Opinion for International Application No. PCT/JP2010/006583, dated Feb. 8, 2011—13 pages 2018.

Entire patent prosecution history of U.S. Appl. No. 13/318,648, filed Nov. 3, 2011, entitled "Welding Method and Welding Device."

* cited by examiner

WELDING DEVICE

This application is a divisional of U.S. patent application Ser. No. 13/318,648, filed Nov. 3, 2011, which is a U.S. National Phase Application of PCT International Application PCT/JP2010/006583, filed Nov. 10, 2010, and claims priority to Japanese Patent Application JP 2009-267123, filed Nov. 25, 2009, the contents of which are incorporated herein by reference.

TECHNICAL FIELD

The present invention relates to a device for performing welding by feeding a welding wire and alternately repeating short circuits and arcs.

BACKGROUND ART

In a conventional device for performing welding by automatically feeding a welding wire and alternately repeating short circuits and arcs, a short circuit is urged to open by supplying a large current to increase the short-circuit current with time until the short circuit opens and an arc occurs.

In the case, however, that the welding wire is made of a material not easily meltable due to its low intrinsic resistivity such as aluminum, the welding wire continues to be semi-molten even when a large current is supplied to open a short circuit. In this case, the short circuit does not open, thus failing to create an arc.

If the short circuit does not smoothly open, welding may be interrupted either due to the buckling of the welding wire or due to the stop of the welding device in response to an overcurrent protection function. The overcurrent protection function protects the welding device and welding jigs from overcurrent.

One well-known method for preventing wire buckling and hence avoiding welding from being interrupted is to monitor the motor current of the wire feeding motor and to stop the feeding of the welding wire (see, for example, Patent Literature 1).

The above-mentioned overcurrent protection function has been conventionally used to protect a welding device and welding jigs at an emergency, such as a short circuit between the tip of the welding wire and the welding output side.

FIG. 7 shows a schematic configuration of a conventional welding device. FIG. 8 shows temporal changes of a welding current and an AS signal which indicates an arc state and a short-circuit state in the conventional welding device. The conventionally used overcurrent protection function is described as follows with reference to FIGS. 7 and 8. FIG. 7 shows the overall structure of the conventional welding device having the overcurrent protection function, and FIG. 8 shows the relation between the waveform of a welding output and various timings in the conventional welding device.

The operation of the welding device shown in FIG. 7 is described with reference to FIG. 8. In the following description, the welding device is a consumable electrode arc welding device which performs welding by alternately repeating short circuits and arcs.

In welding device 1 shown in FIG. 7, welding output unit 2 provides a welding output. Output controller 3 controls welding output unit 2. Current detector 4 detects a welding current. Voltage detector 5 detects a welding voltage. Feeding motor 6 feeds welding wire 9. Feed roller 8 feeds welding wire 9. Base material 12 is an object to be welded, and welding torch 10 creates arc 11 between welding wire 9 and base material 12. Wire feed controller 13 controls feeding motor 6. AS determination unit 14 determines based on the output of voltage detector 5 whether it is an arc state where welding wire 9 and base material 12 are arced, or a short-circuit state where welding wire 9 and base material 12 are short circuited.

In FIG. 7, welding output unit 2 receives a commercial electric power from outside welding device 1, and outputs a welding voltage and a welding current by inverter operation in accordance with welding conditions.

Current detector 4, which can be formed of a current transformer (CT), detects a welding current. Voltage detector 5, which measures the voltage across the output terminals of welding device 1, detects a welding voltage.

AS determination unit 14, which may be composed of a CPU, receives a voltage detection signal from voltage detector 5. When the welding voltage reaches a predetermined detection level (for example, 15V) in a short circuit state, AS determination unit 14 determines that the AS signal indicates an arc state (high level). When, on the other hand, the welding voltage reaches a predetermined detection level (for example, 10V) in an arc state, AS determination unit 14 determines that the AS signal indicates a short-circuit state (low level).

Wire feed controller 13 controls the rotation of feeding motor 6. Feeding motor 6 is connected to feed roller 8 whose rotation allows welding wire 9 to be pressure-fed at a basic feed speed according to welding conditions.

Welding torch 10 supplies the output of welding output unit 2 to welding wire 9, thereby creating arc 11 for welding between the tip of welding wire 9 and base material 12.

In FIG. 8, time point E1 is when a short circuit occurred. Time point E2 is when an arc occurred after time point E1. Time point E3 is when a short circuit occurred after time point E2. Time point E7 is when the current of the short circuit that had occurred at time point E3 reached a predetermined overcurrent protection detection current value IOC. Time point E8 is when an overcurrent protection detection period TOC has passed since time point E7, and the overcurrent protection function comes into operation.

As shown in FIG. 8, since time point E3 at which the short circuit occurred, the short-circuit current is controlled to increase with an appropriate gradient in order to open the short circuit. Opening a short circuit requires outputting an extremely high welding current. The short-circuit current is clipped at a maximum output current value IMAX (for example, 550 A) as an upper limit which is determined according to the performance of welding device 1. The short-circuit current continues to have the maximum output current value IMAX until the short circuit opens and an arc occurs.

Assume that the welding current reached the overcurrent protection detection current value IOC (for example, 500 A) at time point E7, and that the overcurrent protection detection period TOC (for example, 300 msec) passed at time point E8. Also assume that the short circuit did not open between time points E7 and E8, and that the welding current continued to be equal to or more than the overcurrent protection detection current value IOC. In this case, welding device 1 forcefully terminates its output to protect itself and welding jigs from overcurrent.

Even when the short circuit cannot be opened by the time the overcurrent protection detection period TOC passes, welding wire 9 continues to be fed to base material 12. The feeding of welding wire 9 continues until the overcurrent protection function comes into operation to stop the output of welding device 1 and the feeding of welding wire 9. This causes welding wire 9 to be pushed deeply into the weld pool of base material 12, making it much more difficult to open the short circuit.

Failing to open the short circuit during the predetermined period causes the overcurrent protection function to come into operation, and forcefully terminates welding device 1. The forceful termination of welding device 1 interrupts the welding. This often damages base material 12, causes quality issues such as welding defects, or reduces production efficiency.

CITATION LIST

Patent Literature

Patent Literature 1: Japanese Patent Unexamined Publication No. 2008-68283

SUMMARY OF THE INVENTION

An object of the present invention is to provide a method and device for performing welding as follows. A short circuit that does not easily open is urged to open so as to reduce the frequency at which welding is unnecessarily interrupted by an overcurrent protection function. This can prevent welding defects and improve production efficiency.

To solve the conventional problems, in the method of the present invention for performing welding by feeding a welding wire and alternately repeating short circuits and arcs, after the welding current reaches a predetermined first current value during a short circuit, the feeding of the welding wire is stopped, slowed down, or moved backward.

This method urges the opening of a short circuit so as to reduce the frequency at which welding is unnecessarily interrupted by the overcurrent protection function. This achieves high weld quality such as the absence of welding defects, and high production efficiency such as short weld time.

A device of the present invention for performing welding by feeding a welding wire and alternately repeating short circuits and arcs includes a feeding motor for feeding the welding wire; a current detector for detecting a welding current; and a voltage detector for detecting a welding voltage. The device of the present invention further includes an AS determination unit for detecting a short-circuit state and an arc state based on the output of the voltage detector; an output controller for controlling a welding output based on the outputs of the current detector, the voltage detector, and the AS determination unit; a welding output unit for generating a welding output based on the output of the output controller; a current setting unit for setting a first current value as a threshold for the welding current; and a wire feed controller for controlling the feeding of the welding wire based on the outputs of the current setting unit, the AS determination unit, and the current detector. The feeding of the welding wire is stopped, slowed down, or moved backward after the welding current reaches the first current value during a short circuit.

This structure urges the opening of a short circuit so as to reduce the frequency at which welding is unnecessarily interrupted by an overcurrent protection function. This achieves high weld quality such as the absence of welding defects, and high production efficiency such as short weld time.

A device of the present invention for performing welding by feeding a welding wire and alternately repeating short circuits and arcs, includes a feeding motor for feeding the welding wire; a current detector for detecting a welding current; a voltage detector for detecting a welding voltage; an AS determination unit for detecting a short-circuit state and an arc state based on the output of the voltage detector; and an output controller for controlling a welding output based on the outputs of the current detector, the voltage detector, and the AS determination unit. The device of the present invention further includes a welding output unit for generating a welding output based on the output of the output controller; a current setting unit for setting a first current value as a threshold for a welding current; a time keeper for counting a time since the welding current reached the first current value; an elapsed-time setting unit for setting a first predetermined time, which is an elapsed-time threshold since the welding current reached the first current value; and a wire feed controller for controlling the feeding of the welding wire based on the output of the current setting unit, the time keeper, the elapsed-time setting unit, the AS determination unit, and the current detector. The feeding of the welding wire is stopped, slowed down, or moved backward after the first predetermined time has passed since the welding current reached the first current value.

This structure urges the opening of a short circuit so as to reduce the frequency at which welding is unnecessarily interrupted by the overcurrent protection function. This achieves high weld quality such as the absence of welding defects, and high production efficiency such as short weld time.

DETAILED DESCRIPTION OF PREFERRED EMBODIMENTS

Figure 1:
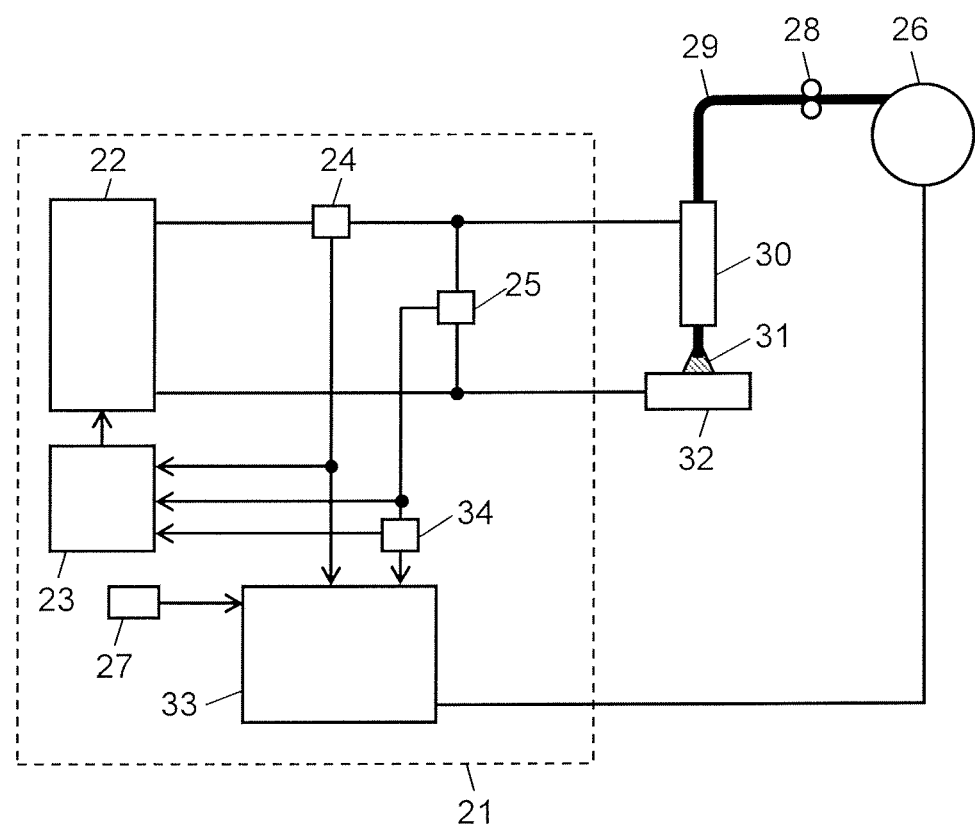
FIG. 1 shows a schematic configuration of a welding device according to a first exemplary embodiment of the present invention.

An embodiment of the present invention will be described as follows with reference to drawings. In these drawings, the same reference numerals are used for the same components, and hence the description thereof may be omitted.

First Exemplary Embodiment

Figure 2:
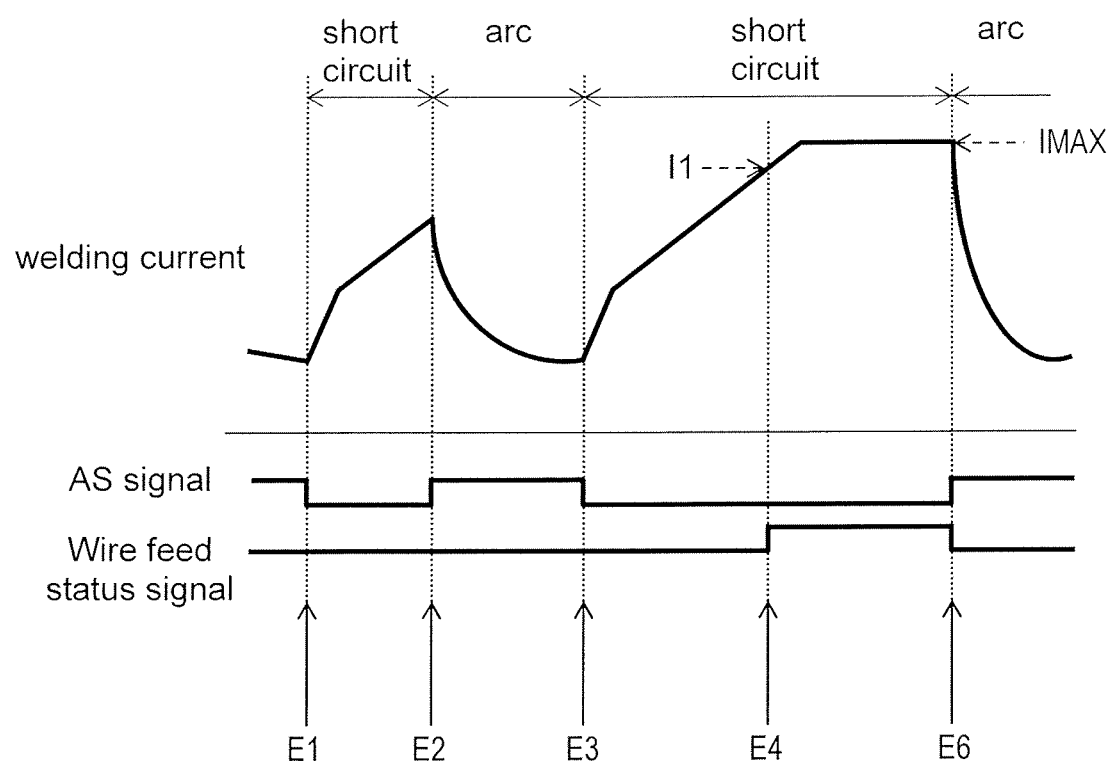
FIG. 2 shows temporal changes of a welding current, an AS signal, and a wire feed status signal in the welding device according to the first exemplary embodiment of the present invention.
Figure 3:
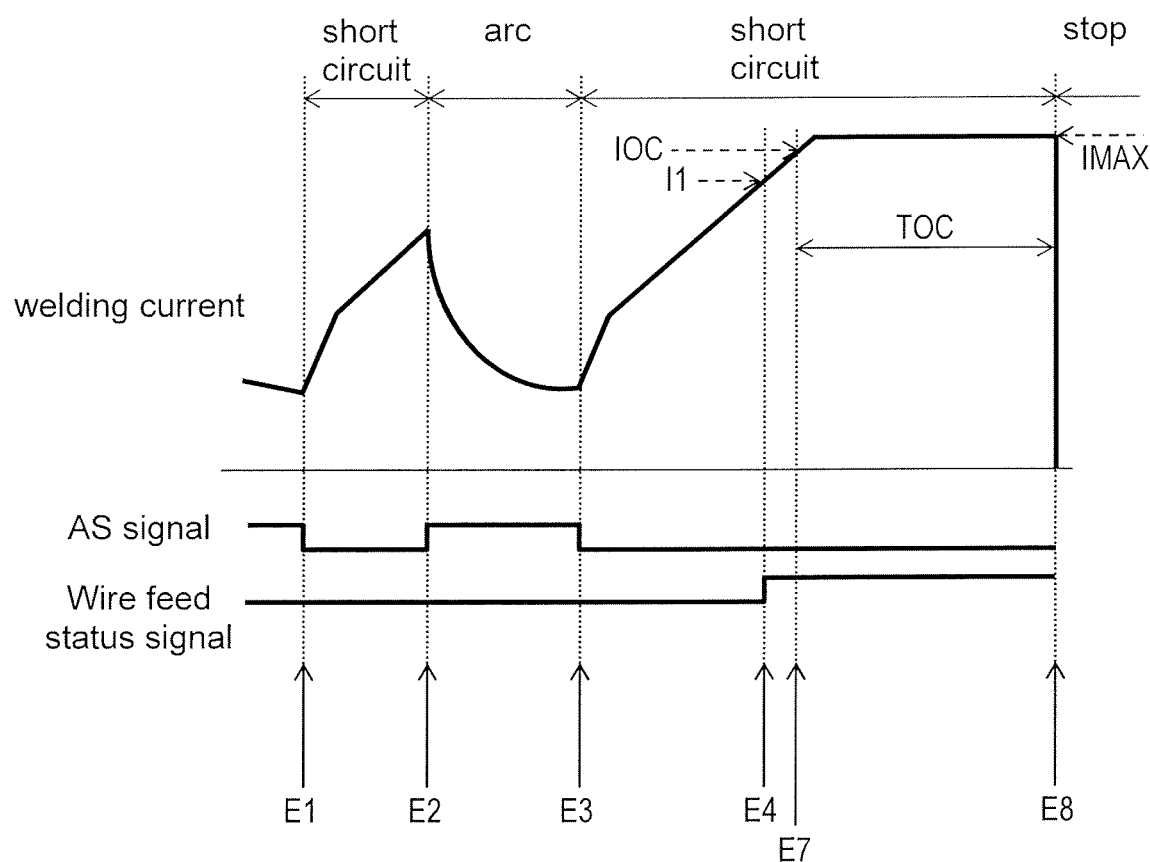
FIG. 3 shows other temporal changes of the welding current, the AS signal, and the wire feed status signal in the welding device according to the first exemplary embodiment of the present invention.

FIG. 1 shows a schematic configuration of welding device 21 according to a first exemplary embodiment of the present invention. FIGS. 2 and 3 show temporal changes of a welding current, an AS signal which indicates an arc state and a short-circuit state, and a wire feed status signal in the welding device.

As an example of a welding device, a consumable electrode arc welding device is described as follows, which performs welding by alternately repeating short circuits and arcs. The operation of welding device 21 shown in FIG. 1 is described with reference to FIGS. 2 and 3.

In welding device 21 shown in FIG. 1, welding output unit 22 provides a welding output. Output controller 23 controls welding output unit 22. Current detector 24 detects a welding current. Voltage detector 25 detects a welding voltage. Feeding motor 26 feeds welding wire 29. Current setting unit 27 sets a threshold for the welding current. Feed roller 28 feeds, via welding torch 30, welding wire 29 to base material 32, which is an object to be welded. Arc 31 is created between welding wire 29 and base material 32. Wire feed controller 33 controls the feeding motor. AS determination unit 34 determines based on the output of voltage detector 25 whether it is an arc state where welding wire 29 and base material 32 are arced, or a short-circuit state where welding wire 29 and base material 32 are short circuited.

In FIG. 1, welding output unit 22 of welding device 21 receives a commercial electric power (for example, three-phase 200V) from outside welding device 21, and outputs a welding voltage and a-welding current by inverter operation in accordance with welding conditions.

Welding output unit 22 has an inverter, which can be generally an insulated gate bipolar transistor (IGBT) or a metal-oxide semiconductor field effect transistor (MOSFET), which is driven by the pulse width modulation (PWM) operation or the phase shift operation.

Current detector 24, which can be formed of a current transformer (CT), detects a welding current. Voltage detector 25, which measures the voltage across the output terminals of welding device 21, detects a welding voltage.

AS determination unit 34, which may be composed of a CPU, receives a voltage detection signal from voltage detector 25. When the welding voltage increased during a short circuit reaches a predetermined detection level (for example, 15V), AS determination unit 34 determines that the AS signal indicates an arc state (hereinafter, "arc determination" corresponding to "high level"). When the welding voltage decreased during an arc reaches a predetermined detection level (for example, 10V), AS determination unit 34 determines that the AS signal indicates a short-circuit state (hereinafter, "short-circuit determination" corresponding to "low level").

Output controller 23, which may be composed of a CPU, controls welding output unit 22 based on the outputs of current detector 24, voltage detector 25, and AS determination unit 34. Current setting unit 27, which may also be composed of a CPU, sets a first current value I1 as a threshold for the welding current.

Wire feed controller 33 controls the rotation of feeding motor 26 based on the outputs of current setting unit 27, AS determination unit 34, and current detector 24. Feeding motor 26 is connected to feed roller 28 whose rotation allows welding wire 29 to be pressure-fed at a basic feed speed according to welding conditions. Welding torch 30 supplies the welding current and the welding voltage from welding output unit 22 to welding wire 29, thereby creating arc 31 for welding between the tip of welding wire 29 and base material 32.

The following is a description, with reference to FIG. 2, of how the opening of a short circuit is urged if the short circuit does not easily open.

In FIG. 2, time point E1 is when a short circuit occurred. Time point E2 is when an arc occurred after time point E1. Time point E3 is when a short circuit occurred after time point E2. Time point E4 is when the current of the short circuit that had occurred at time point E3 reached the first current value I1, which is a predetermined threshold for the welding current. Time point E6 is when an arc occurred after time point E4. IMAX indicates a maximum output current value of welding device 21.

As shown in FIG. 2, the AS signal outputted by AS determination unit 34 becomes low (short circuit determination) at time point E1 at which the short circuit occurred, and becomes high (arc determination) at time point E2 at which the arc occurred. When the welding process is stable, the short circuit duration is within 10 msec.

Since time point E3 at which the short circuit occurred, the short-circuit current is increased with an appropriate gradient in order to open the short circuit. Opening a short circuit requires supplying an extremely high welding current to welding wire 29. The increasing short-circuit current has an upper limit of a maximum output current value IMAX (for example, 550 A) which is determined according to the performance of welding device 21. After reaching the maximum output current value IMAX, the welding current continues to have the maximum output current value IMAX until the short circuit opens and an arc occurs.

The maximum output current value IMAX is generally determined by absolute maximum ratings of a semiconductor device such as an IGBT or a MOSFET used in the inverter of welding device 21. Wire feed controller 33 sets the wire feed status signal to the ON state (high level) at time point E4 after the welding current reached the first current value I1 (for example, 400 A) set by current setting unit 27 during the short circuit that had occurred at time point E3.

When the wire feed status signal is in the OFF state (low level), welding wire 29 is fed toward base material 32 at the predetermined basic feed speed. When the wire feed status signal is in the ON state, on the other hand, wire feed controller 33 stops the operation of feeding motor 26, thereby stopping the feeding of welding wire 29.

When the wire feed status signal is in the ON state, wire feed controller 33 may control the operation of feeding motor 26 instead of stopping it such that the wire feed speed is lower than the basic feed speed. The basic feed speed is used when the wire feed status signal is in the OFF state as described above. More specifically, the wire feed speed may be slowed down to 25% of the basic feed speed, a minimum possible wire feed speed, or the initial wire feed speed at the start of welding (generally called a "slow-down speed" which is lower than the speed in steady-state welding).

Alternatively, when the wire feed status signal is in the ON state, wire feed controller 33 may control the operation of feeding motor 26 instead of stopping it such that welding wire 29 is fed backward. More specifically, the backward feed speed may be 25% of the basic feed speed, a minimum possible wire feed speed, or the initial wire feed speed at the start of welding (generally called a "slow-down speed"). Alternatively, the wire feed speed may be zero (in the stopped state) to avoid feeding welding wire 29 too much when a predetermined time (for example, 200 msec) has passed since the start of the backward feeding.

Although not illustrated, feed roller 28 has a feed-roller pressure device to stop the feeding of welding wire 29. The feed-roller pressure device may be a magnetic valve capable of controlling the pressure of feed roller 28. When the wire feed status signal is in the ON state, the feed-roller pressure device reduces the pressure that is applied by feed roller 28 to welding wire 29. As a result, feed roller 28 is put into an idle state, thereby stopping the feeding of welding wire 29.

Although not illustrated, there is provided a pressure clamp brake such as a magnetic valve to stop the feeding of welding wire 29. The pressure clamp brake is disposed somewhere along the feed passage of the welding wire formed, for example, of a conduit cable extending from feed roller 28 to welding torch 30. When the wire feed status signal is in the ON state, the pressure clamping force of the pressure clamp brake may provide a frictional resistance to welding wire 29 so as to clamp it, thereby stopping the feeding of welding wire 29.

As shown in FIG. 2, wire feed controller 33 sets the wire feed status signal to the OFF state (low level) at time point E6 at which the short circuit opened and an arc occurred, while the wire feed status signal is in the ON state, and the feeding of welding wire 29 is stopped, slowed down, or moved backward. Wire feed controller 33 then controls feeding motor 26 to return the wire feed speed to the original speed (basic feed speed) that is used before the wire feed status signal is turned on. Thus, the feeding of welding wire 29 is continued.

Figure 8:
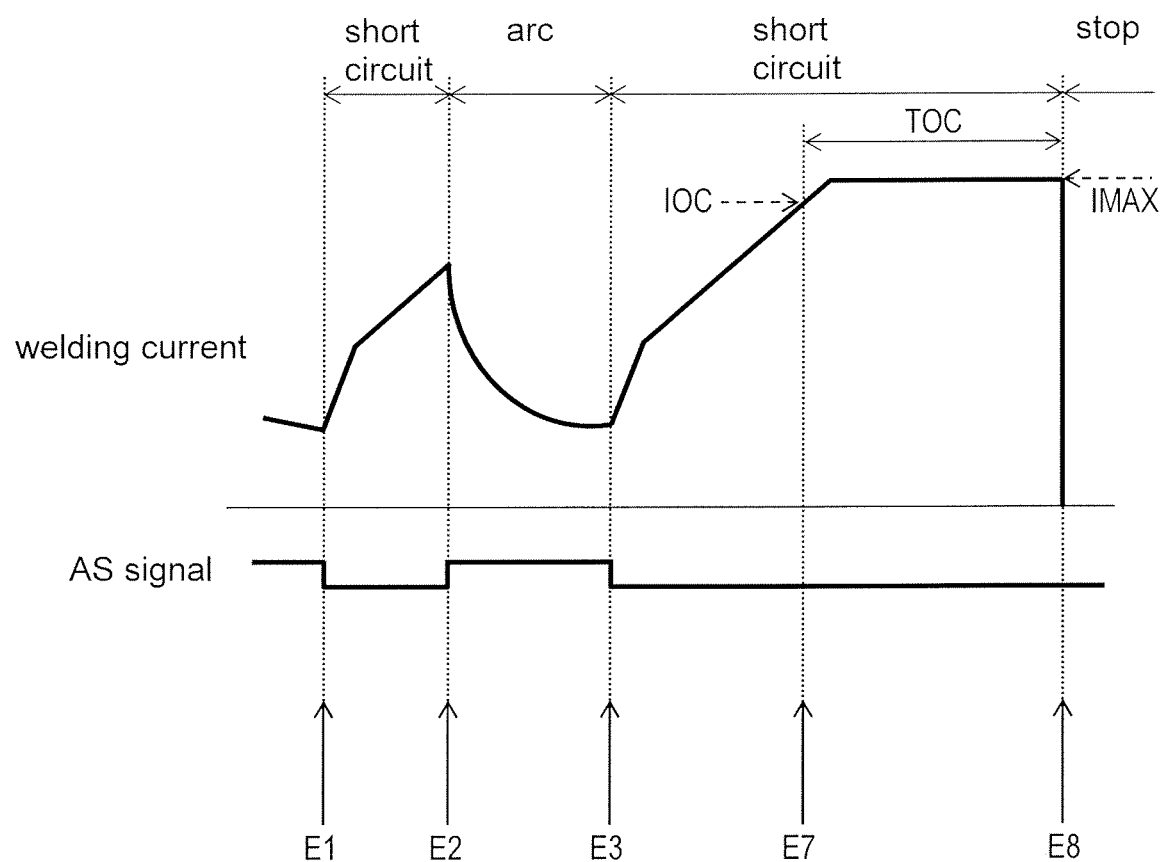
FIG. 8 shows temporal changes of a welding current and an AS signal which indicates an arc state and a short-circuit state in the conventional welding device.

The overcurrent protection function of the present first exemplary embodiment is described with reference to FIG. 3. As described above, the maximum output current value IMAX may continue for a predetermined period even when the feeding of welding wire 29 is stopped, slowed down, or moved backward while the wire feed status signal is in the ON state in order to urge the opening of the short circuit. In such a case, the overcurrent protection function operates in the same manner as described in the BACKGROUND ART with FIG. 8.

In FIG. 3, time point E7 is when the short-circuit current reached a predetermined overcurrent protection detection current value IOC. Time point E8 is when a predetermined overcurrent protection detection period TOC has passed since time point E7 and the overcurrent protection function operates to stop the welding output of welding device 21.

In FIG. 3, since time point E3 at which the short circuit occurred, the short-circuit current is increased and clamped at a maximum output current value IMAX (for example, 550 A) as an upper limit. Then, the overcurrent protection detection current value IOC is set to be equal to or lower (for example, 500 A) than the maximum output current value IMAX. The overcurrent protection detection current value IOC is a reference current value used to determine whether the welding output should be stopped to protect welding device 21 and welding jigs from overcurrent. In the example shown in FIG. 3, the overcurrent protection detection current value IOC is smaller than the maximum output current value.

In FIG. 3, welding device 21 is forcefully stopped for overcurrent protection if the short circuit does not open by time point E8 at which the overcurrent protection detection time TOC (for example, 300 msec) has passed since time point E7 at which the short-circuit current exceeded the overcurrent protection detection current value IOC.

As described above, the feeding of welding wire 29 can be stopped, slowed down, or moved backward when the welding current reaches the first current value I1 to prevent welding wire 29 from being pushed deeply into the weld pool of base material 32 during a short circuit. This urges the opening of a short circuit so as to reduce the frequency at which welding is unnecessarily interrupted by the overcurrent protection function. As a result, welding defects are prevented, and high production efficiency is maintained.

The first current value I1 shown in FIGS. 2 and 3 can be equal to the overcurrent protection current value IOC. In this case, the welding current can be reliably determined to be short-circuited for a long time. This prevents feeding motor 26 from being stopped unnecessarily due to erroneous determination. In addition, this reduces the consumption of mechanism elements such as the reduction gear of feeding motor 26 and feed roller 28. As a result, a reliable welding system can be provided. In the example shown in FIG. 3, the first current value I1 is smaller than the overcurrent protection current value IOC.

In the method of the present invention for performing welding by feeding welding wire 29 and alternately repeating short circuits and arcs, after the welding current reaches the predetermined first current value I1 during a short circuit, the feeding of welding wire 29 is stopped, slowed down, or moved backward.

This method urges the opening of a short circuit so as to reduce the frequency at which welding is unnecessarily interrupted by the overcurrent protection function. This achieves high weld quality such as the absence of welding defects, and high production efficiency such as short weld time.

In this method, the first current value I1 is equal to the predetermined overcurrent protection detection current value IOC, which is the reference current value used to determine whether the welding output should be stopped to protect welding device 21 from overcurrent.

In this method, the welding current can be reliably determined to be short-circuited for a long time. This prevents feeding motor 26 from being stopped unnecessarily due to erroneous determination. In addition, this reduces the consumption of mechanism elements such as the reduction gear of feeding motor 26 and feed roller 28. As a result, a reliable welding system can be provided.

Welding device 21 of the present invention for performing welding by feeding welding wire 29 and alternately repeating short circuits and arcs includes feeding motor 26, current detector 24, voltage detector 25, AS determination unit 34, output controller 23, welding output unit 22, current setting unit 27, and wire feed controller 33. Feeding motor 26 feeds welding wire 29, and current detector 24 detects a welding current. Voltage detector 25 detects a welding voltage. AS determination unit 34 detects a short-circuit state or an arc state based on the output of voltage detector 25. Output controller 23 controls the welding output based on the outputs of current detector 24, voltage detector 25, and AS determination unit 34. Welding output unit 22 generates a welding output based on the output of output controller 23. Current setting unit 27 sets the first current value I1 as the threshold for the welding current. Wire feed controller 33 controls the feeding of welding wire 29 based on the outputs of current setting unit 27, AS determination unit 34, and current detector 24. Thus, in welding device 21 of the present invention, the feeding of welding wire 29 is stopped, slowed down, or moved backward when the welding current reaches the first current value I1 during a short circuit.

This structure urges the opening of a short circuit so as to reduce the frequency at which welding is unnecessarily interrupted by the overcurrent protection function. This achieves high weld quality such as the absence of welding defects, and high production efficiency such as short weld time.

The present first exemplary embodiment has described consumable electrode short-circuit welding; however, consumable electrode pulse welding can alternatively be used to obtain similar effects in short-circuit conditions.

Second Exemplary Embodiment

Figure 4:
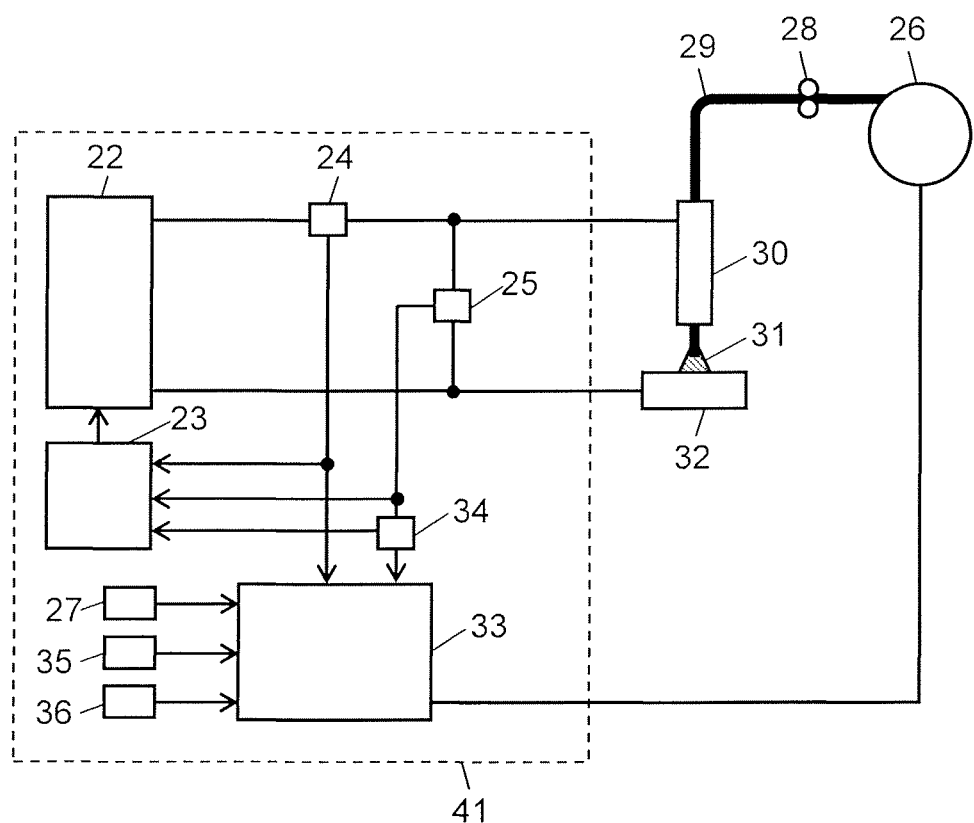
FIG. 4 is a schematic configuration of a welding device according to a second exemplary embodiment of the present invention.
Figure 5:
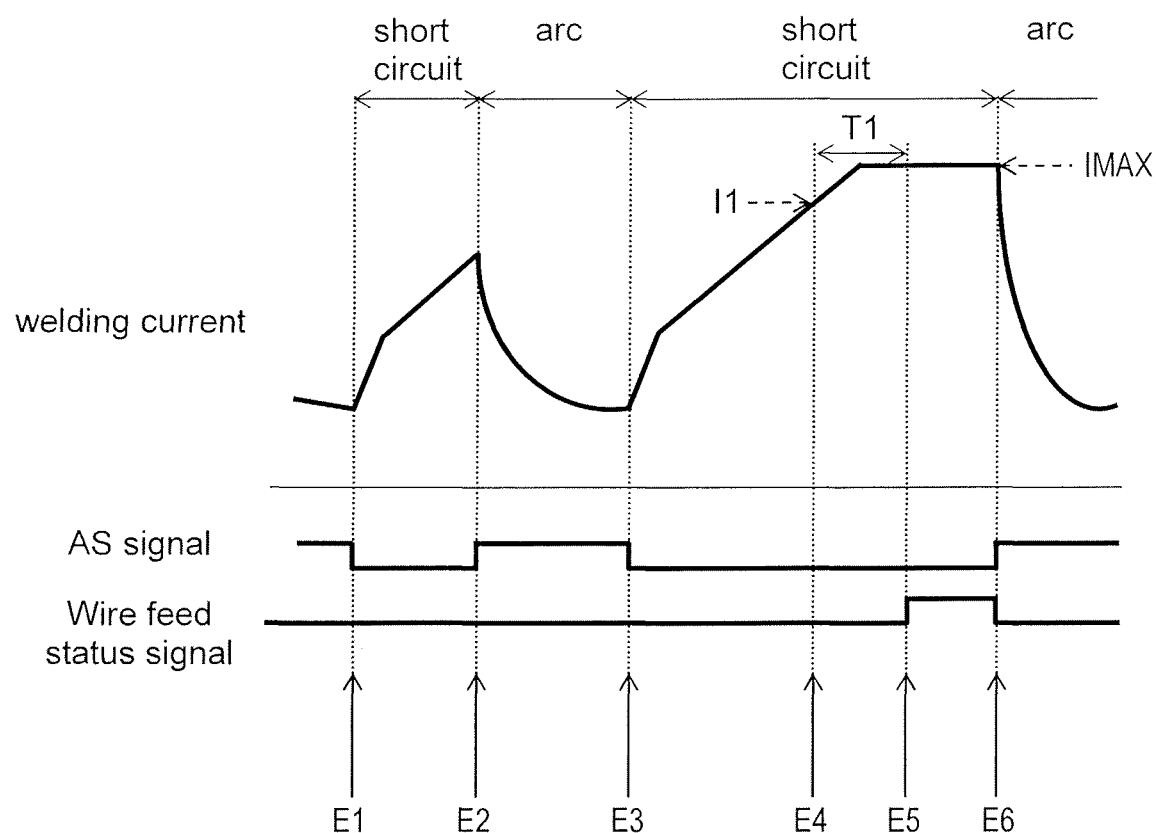
FIG. 5 shows temporal changes of a welding current, an AS signal, and a wire feed status signal in the welding device according to the second exemplary embodiment of the present invention.
Figure 6:
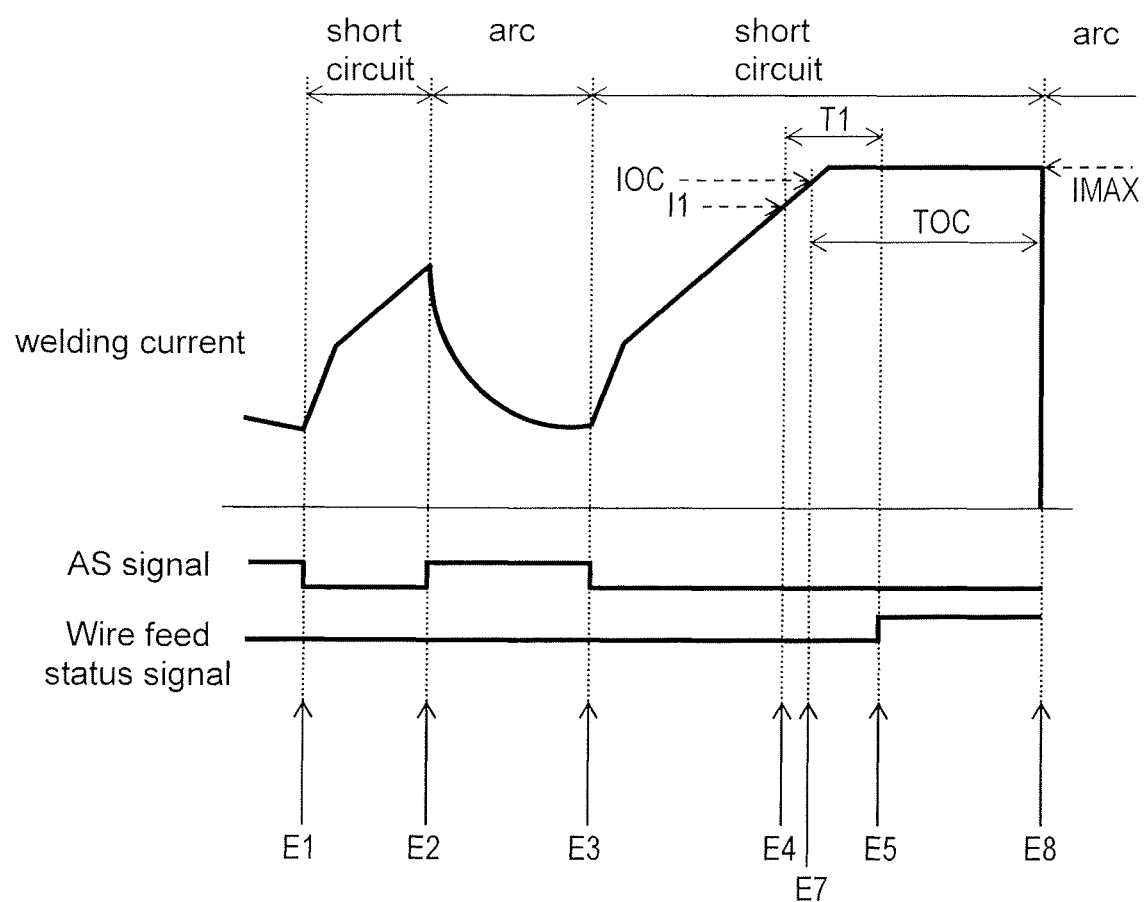
FIG. 6 shows other temporal changes of the welding current, the AS signal, and the wire feed status signal in the welding device according to the second exemplary embodiment of the present invention.
Figure 7:
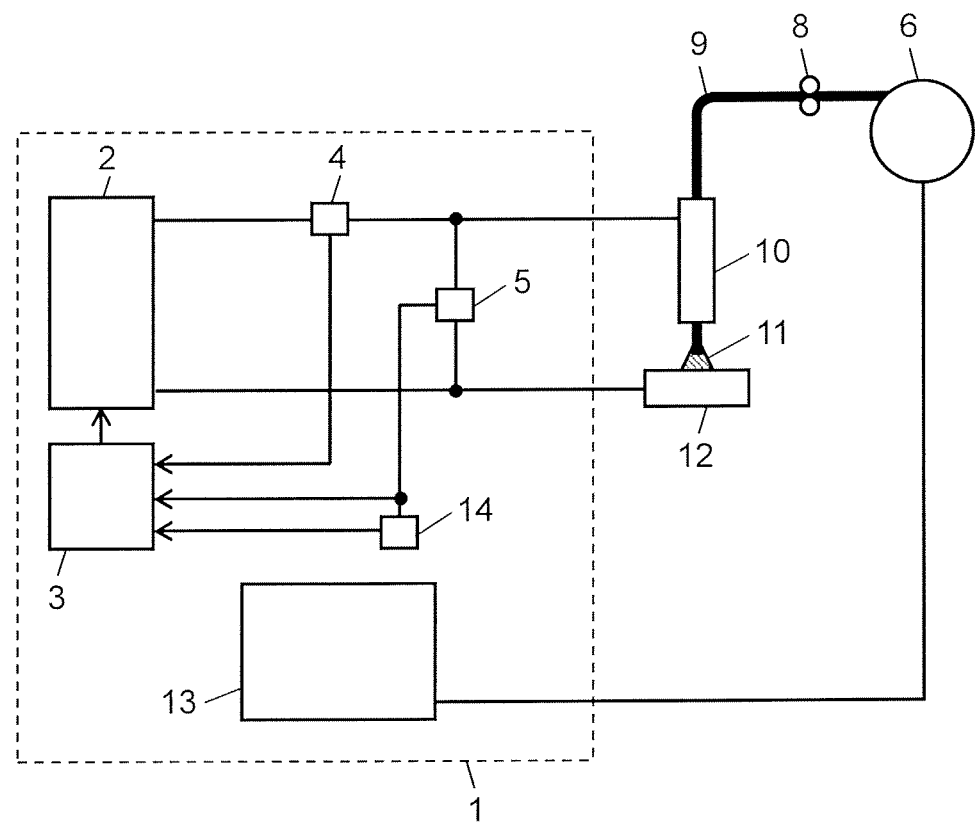
FIG. 7 is a schematic configuration of a conventional welding device.

Welding device 41 and its operation according to a second exemplary embodiment of the present invention is described with reference to FIGS. 4 to 6. FIG. 4 is a schematic configuration of welding device 41. FIGS. 5 and 6 show temporal changes of a welding current, an AS signal which indicates an arc state and a short-circuit state, and a wire feed status signal in the welding device according to the second exemplary embodiment.

The main difference of welding device 41 of FIG. 4 from welding device 21 of FIG. 1 is to include elapsed-time setting unit 35 and time keeper 36, which will be described later.

As shown in FIG. 4, elapsed-time setting unit 35, which may be composed of a CPU, sets a first predetermined time T1 as an elapsed-time threshold since the welding current reached the first current value I1. Time keeper 36, which may also be composed of a CPU, counts the time since the welding current reached the first current value I1.

Wire feed controller 33 controls the rotation of feeding motor 26 based on the outputs of current setting unit 27, time keeper 36, elapsed-time setting unit 35, AS determination unit 34, and current detector 24.

Feeding motor 26 is connected to feed roller 28 whose rotation allows welding wire 29 to be pressure-fed at a basic feed speed according to welding conditions. Welding torch 30 supplies the welding current and the welding voltage from welding output unit 22 to welding wire 29, thereby creating arc 31 for welding between the tip of welding wire 29 and base material 32.

The following is a description, with reference to FIG. 5, of how the opening of a short circuit is urged if the short circuit does not easily open.

In FIG. 5, time point E5 is when the first predetermined time T1 set by elapsed-time setting unit 35 has passed since time point E4.

In FIG. 5, since time point E3 at which the short circuit occurred, the short-circuit current is increased with an appropriate gradient in order to open the short circuit. Opening a short circuit requires supplying an extremely high welding current to welding wire 29. The increasing short-circuit current has an upper limit of a maximum output current value IMAX (for example, 550 A) which is determined according to the performance of welding device 41. After reaching the maximum output current value IMAX, the welding current continues to have the maximum output current value IMAX until the short circuit opens and an arc occurs.

Wire feed controller 33 sets the wire feed status signal to the ON state (high level) at time point E5 during the short circuit that had occurred at time point E3. As described above, time point E5 is when the first predetermined time T1 counted by time keeper 36 has passed since time point E4 at which the welding current reached the first current value I1 (for example, 400 A) set by current setting unit 27. When the wire feed status signal is in the ON state, wire feed controller 33 stops the operation of feeding motor 26, thereby stopping the feeding of welding wire 29. Alternatively, as in the first exemplary embodiment, the feeding of welding wire 29 may be slowed down or moved backward instead of being stopped.

Wire feed controller 33 sets the wire feed status signal to the OFF state (low level) at time point E6 at which the short circuit opened and an arc occurred. Then, wire feed controller 33 controls feeding motor 26 to return the wire feed speed to the original speed (hereinafter, "basic feed speed") that is used before the wire feed status signal is turned on.

The overcurrent protection function of the present exemplary embodiment is described with reference to FIG. 6. As described above, the maximum output current value IMAX may continue for a predetermined period even when the feeding of welding wire 29 is stopped, slowed down, or moved backward while the wire feed status signal is in the ON state in order to urge the opening of the short circuit. In such a case, the overcurrent protection function operates in the same manner as described in the BACKGROUND ART with FIG. 8.

In FIG. 6, since time point E3 at which the short circuit occurred, the short-circuit current is increased and clamped at a maximum output current value IMAX (for example, 550 A) as an upper limit. Then, the overcurrent protection detection current value IOC is set to be equal to or lower (for example, 500 A) than the maximum output current value. The overcurrent protection detection current value IOC is a reference current value used to determine whether the welding output should be stopped to protect welding device 41 and welding jigs from overcurrent. In the example shown in FIG. 6, the overcurrent protection detection current value IOC is smaller than the maximum output current value.

In FIG. 6, welding device 41 is forcefully stopped for overcurrent protection if the short circuit does not open by time point E8 at which the overcurrent protection detection time TOC (for example, 300 msec) has passed since time point E7 at which the short-circuit current exceeded the overcurrent protection detection current value IOC.

The first predetermined time T1 shown in FIG. 5 may be set shorter, for example, by 100 msec, than the overcurrent protection detection time TOC. More specifically, the first predetermined time T1 can be 200 msec or so.

The feed passage through which welding wire 29 is fed is larger than designed, and it takes a certain time for feeding motor 26 and feed roller 28 to come to a stop. Therefore, it takes a certain time until the tip of welding wire 29 fed from time point E5 in FIG. 5 is stopped, starts to be slowed down, or starts to be moved backward. It generally takes 100 msec or so, and consequently, the first predetermined time T1 can be set shorter by at least 100 msec than the overcurrent protection detection time TOC. As a result, the opening of a short circuit can be successfully urged.

As described above, in the method of the present invention for performing welding, the feeding of welding wire 29 is stopped, slowed down, or moved backward after the first predetermined time T1 has passed since the time point at which the welding current reached the first current value I1.

This method prevents welding wire 29 from being pushed deeply into the weld pool of base material 32 during a short circuit, thereby urging the opening of a short circuit. This reduces the frequency at which welding is unnecessarily interrupted by the overcurrent protection function. As a result, welding defects are prevented, and high production efficiency is maintained.

The feeding of welding wire 29 is stopped, slowed down, or moved backward after the first predetermined time T1 has passed since the time point at which the welding current reached the first current value I1.

This method prevents feeding motor 26 from being stopped unnecessarily, and reduces the consumption of mechanism elements such as the reduction gear of feeding motor 26 and feed roller 28. As a result, a reliable welding system can be provided.

In this method, the first predetermined time T1 is shorter than the predetermined overcurrent protection detection time TOC, which is the reference time used to determine whether the welding output should be stopped to protect welding device 41 from overcurrent. More specifically, the first predetermined time T1 can be shorter by 100 msec or so than the overcurrent protection detection time TOC to ensure to stop welding wire 29 before the overcurrent protection function is operated. As a result, the opening of a short circuit is successfully urged.

In this method, when a short circuit opens and an arc occurs after the feeding of the welding wire is stopped, slowed down, or moved backward, the feeding of the welding wire is returned to the state it was before being stopped, slowed down, or moved backward. This method allows a smooth welding operation.

Welding device 41 of the present invention for performing welding by feeding welding wire 29 and alternately repeating short circuits and arcs includes feeding motor 26, current detector 24, voltage detector 25, AS determination unit 34, output controller 23, welding output unit 22, current setting unit 27, and wire feed controller 33. Feeding motor 26 feeds a welding wire, and current detector 24 detects a welding current. Voltage detector 25 detects a welding voltage. AS determination unit 34 detects a short-circuit state and an arc state based on the output of voltage detector 25. Output controller 23 controls the welding output based on the outputs of current detector 24, voltage detector 25, and AS determination unit 34. Welding output unit 22 generates a welding output based on the output of output controller 23. Current setting unit 27 sets the first current value I1 as the threshold for the welding current. Time keeper 36 counts the time since the welding current reached the first current value I1. Elapsed-time setting unit 35 sets the first predetermined time T1 as the elapsed-time threshold since the welding current reached the first current value I1. Wire feed controller 33 controls the feeding of welding wire 29 based on the outputs of current setting unit 27, time keeper 36, elapsed-time setting unit 35, AS determination unit 34, and current detector 24. Welding device 41 of the present invention stops, slows down, or moves backward the feeding of the welding wire when the first predetermined time T1 has passed since the welding current reached the first current value I1.

This structure urges the opening of the short circuit so as to reduce the frequency at which welding is unnecessarily interrupted by the overcurrent protection function. This achieves high weld quality such as the absence of welding defects, and high production efficiency such as short weld time.

The present exemplary embodiment has described consumable electrode short-circuit welding; however, consumable electrode pulse welding can alternatively be used to obtain similar effects in short-circuit conditions.

INDUSTRIAL APPLICABILITY

As described hereinbefore, the present invention prevents welding defects and improves production efficiency by urging the opening of a short circuit. Therefore, the method and device for performing welding of the present invention is applicable to fields of constructing LNG tanks, ships, bridges, and other structures where consumable electrode arc welding is used to ensure high weldability of thick boards.

REFERENCE MARKS IN THE DRAWINGS 21, 41 welding device
22 welding output unit
23 output controller
24 current detector
25 voltage detector
26 feeding motor
27 current setting unit
28 feed roller
29 welding wire
30 welding torch
31 arc
32 base material
33 wire feed controller
34 AS determination unit
35 elapsed-time setting unit
36 time keeper.

The invention claimed is:

1. A device for performing welding by feeding a welding wire and alternately repeating short circuits and arcs, the device comprising:
   a feeding motor for feeding the welding wire;
   a current detector for detecting a welding current;
   a voltage detector for detecting a welding voltage;
   an AS determination unit for detecting a short-circuit state and an arc state based on an output of the voltage detector;
   an output controller for controlling a welding output based on an output of the current detector, the output of the voltage detector, and an output of the AS determination unit;
   a welding output unit for generating a welding output based on an output of the output controller;
   a current setting unit for setting a first current value as a threshold for the welding current; and
   a wire feed controller for controlling the feeding of the welding wire based on an output of the current setting unit, the output of the AS determination unit, and the output of the current detector, wherein
   the feeding of the welding wire is stopped, slowed down, or moved backward after the welding current reaches the first current value during a short circuit, the first current value being larger than the welding current at a start of the short circuit.

2. The device of claim 1, wherein
   the first current value is equal to a predetermined overcurrent protection detection current value, the predetermined overcurrent protection detection current value being a reference current value used to determine whether a welding output should be stopped in order to protect the device from overcurrent.

3. A device for performing welding by feeding a welding wire and alternately repeating short circuits and arcs, the device comprising:
   a feeding motor for feeding the welding wire;
   a current detector for detecting a welding current;
   a voltage detector for detecting a welding voltage;
   an AS determination unit for detecting a short-circuit state and an arc state based on an output of the voltage detector;

an output controller for controlling a welding output based on an output of the current detector, the output of the voltage detector, and an output of the AS determination unit;

a welding output unit for generating a welding output based on an output of the output controller;

a current setting unit for setting a first current value as a threshold for the welding current;

a time keeper for counting a time since the welding current reached the first current value;

an elapsed-time setting unit for setting a first predetermined time, the first predetermined time being an elapsed-time threshold since the welding current reached the first current value; and a wire feed controller for controlling the feeding of the welding wire based on an output of the current setting unit, an output of the time keeper, an output of the elapsed-time setting unit, the output of the AS determination unit, and the output of the current detector, wherein the feeding of the welding wire is stopped, slowed down, or moved backward after the first predetermined time has passed since the welding current reached the first current value during a short circuit, the first current value being larger than the welding current at a start of the short circuit.

4. The device of claim 3, wherein the feeding of the welding wire is stopped, slowed down, or moved backward after a first predetermined time has passed since the welding current reached the first current value; and the first predetermined time is shorter than a predetermined overcurrent protection detection time, the predetermined overcurrent protection detection time being a reference time used to determine whether a welding output should be stopped in order to protect the device from overcurrent.

* * * * *